(12) United States Patent
Mundy et al.

(10) Patent No.: US 6,779,034 B1
(45) Date of Patent: *Aug. 17, 2004

(54) COST-EFFECTIVE ACCESS TO NETWORK RESOURCES

(75) Inventors: Joy A. Mundy, Menlo Park, CA (US); Andrew T. McFadden, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 417 days.

This patent is subject to a terminal disclaimer.

(21) Appl. No.: 10/003,808

(22) Filed: Nov. 2, 2001

Related U.S. Application Data

(63) Continuation of application No. 09/209,632, filed on Dec. 11, 1998, now Pat. No. 6,317,792.

(51) Int. Cl.[7] .................................................. G06F 3/00
(52) U.S. Cl. ....................................................... 709/227
(58) Field of Search ................................ 709/223–225, 709/227–229

(56) References Cited

U.S. PATENT DOCUMENTS

| | | | | |
|---|---|---|---|---|
| 4,852,151 A | * | 7/1989 | Dittakavi et al. | 379/93.35 |
| 4,922,523 A | * | 5/1990 | Hashimoto | 379/93.25 |
| 4,975,944 A | * | 12/1990 | Cho | 379/209.01 |
| 4,995,074 A | * | 2/1991 | Goldman et al. | 379/93.35 |
| 5,241,587 A | * | 8/1993 | Horton et al. | 379/92.03 |
| 5,862,339 A | * | 1/1999 | Bonnaure et al. | 709/227 |
| 6,145,086 A | * | 11/2000 | Bellemore et al. | 713/202 |
| 6,317,792 B1 | * | 11/2001 | Mundy et al. | 709/227 |

\* cited by examiner

Primary Examiner—David Wiley
Assistant Examiner—George Neurauter, Jr.
(74) Attorney, Agent, or Firm—Workman Nydegger

(57) ABSTRACT

Selecting points-of-presence (POPs) to be used by client systems when accessing network resources. An access monitoring system capable of monitoring client system usage compiles usage profiles for client systems as POPs are used to access the Internet. The POPs may charge for Internet access according a flat periodic fee, hourly rates, per-port rates, or other arrangements. Periodically, the access monitoring system evaluates the usage profiles to determine whether the client systems could have obtained access for lower access costs if different POPs had been used. If so, the access monitoring system identifies the appropriate, cost-effective POPs and generates information enabling the client systems to use the appropriate POPs. To subsequently access the Internet, the client systems use the information to establish communication with the appropriate POPs. POP selection can also be conducted to balance load between various POPs based on the usage patterns described by the usage profiles.

32 Claims, 4 Drawing Sheets

COST-EFFECTIVE ACCESS TO NETWORK RESOURCES

RELATED APPLICATION

This application is a continuation of U.S. patent application Ser. No. 09/209,632, entitled "Generation and Execution of Scripts for Enabling Cost-Effective Access to Network Resources", filed Dec. 11, 1998 now U.S. Pat. No. 6,317,792, which is incorporated herein by reference.

BACKGROUND OF THE INVENTION

1. The Field of the Invention

The present invention relates to systems and methods for accessing network resources via the Internet or another wide area network. In particular, the present invention relates to systems and methods for selecting one or more points of presence for use by a client system to access the Internet or another wide area network, wherein the points of presence are selected based on cost or reliability considerations.

2. The Prior State of the Art

As the use of the Internet has increased over recent years, the number and availability of Internet service providers has likewise increased. Internet service providers operate points of presence (POPs), which include modem pools permitting users to access the Internet. In a typical arrangement by which home or business users gain access to the Internet, the users enter into a contractual agreement with an Internet service provider, whereby the user is allowed to access the Internet by means of a POP operated by the Internet service provider. Users typically prefer POPs that can be accessed by a local telephone call in order to minimize telephone expenses associated with dialing in to the POPs.

There are currently two primary billing arrangements used by Internet service providers to serve individual or business users. First, some Internet service providers allow access to POPs on an hourly basis. Second, other Internet service providers permit users to access POPs at a flat periodic rate, such as a flat monthly rate. In the first arrangement, users pay only for the time that they use, and therefore have the incentive to limit access time. Under the second arrangement, users have unlimited access and have little incentive to limit access time. Traditionally, heavy Internet users have favored flat fee POPs, while relatively light users have preferred hourly rate POPs.

While the forgoing model has been used by many Internet service providers and individual users, it has exhibited several problems in practice. For example, individual users who contract with one Internet service provider may have access to only one POP. If the assigned POP experiences heavy loads during, for example, peak hours of use, some users are likely to experience busy signals and are unable to access the Internet. If the user desires to ensure access to the Internet at all times, the user often must choose a more expensive alternative. For instance, users can choose the costly alternatives of subscribing to multiple Internet service providers or paying a premium to have access to multiple POPs or to a POP that is reliably available at all times. In addition, Internet users find it inconvenient to switch service providers for several reasons. For example, switching Internet service providers often requires significant time and effort, and can require the user to obtain a new e-mail address, which can cause disruption of normal receipt of e-mail.

In response to the unreliable access that has been frequently experienced by Internet users, there are now some organizations that act as brokers between Internet service providers and subscribers. In return for an hourly or a flat monthly charge, such brokers assume the responsibility of providing subscribers with reliable Internet access, which may require providing access to POPs operated by different Internet service providers. For example, an Internet access broker might enter into a contractual agreement with more than one Internet service provider in a particular geographic area, each of which operates one or more POPs. Subscribers of the Internet access broker can then access the Internet using any available POP as instructed by the Internet access broker. From the standpoint of the subscriber, using an Internet access broker is desirable because reliability can be greatly improved.

Internet access brokers typically deal with Internet service providers that offer access to POPs on hourly rates or flat fees. In addition, some Internet service providers charge Internet access brokers for POP access according to a third model, in which the access costs are proportional to the maximum number of ports at the POP that are simultaneously used by subscribers during any period of the billing cycle. To illustrate, if ten ports are simultaneously used by subscribers of a particular Internet access broker at a peak time during a month, the Internet access broker is charged a rate based on ten ports.

Internet access brokers may have hundreds or more subscribers in a given geographical area, who are served by a large number of POPs. The success of an Internet access broker can depend on the ability to effectively instruct subscribers to access POPs that provide reliable service and are also cost effective. However, it has proved to be difficult to manage the Internet access of many subscribers so that Internet service is delivered reliably and efficiently.

In view of the foregoing, it would be an advancement in the art to provide systems and methods for permitting Internet access brokers to instruct subscribers to access POPs in a manner that results in reliable service to the subscribers and cost-effective load distribution for the brokers. It would be particularly useful for such techniques to be compatible with the various billing arrangements employed by Internet service providers and flexible enough to adapt to billing arrangements that may be used in the future.

SUMMARY AND OBJECTS OF THE INVENTION

The present invention relates to systems and methods for distributing network traffic among multiple POPs in a cost-effective and efficient manner. According to the invention, an intermediary, such as an Internet access broker, that contracts with multiple Internet service providers can distribute loads among different POPs in order to improve access reliability compared to conventional systems. Moreover, the intermediary can reduce overall Internet access costs by matching subscribers' usage patterns with the billing practices of the Internet service providers.

According to the invention, an intermediary offers Internet access to subscribers via multiple POPs in the geographic area of the subscribers. Internet service providers operating the POPs may charge the intermediary for subscribers' access using any conventional billing practice. For example, different POPs may be available on a fixed monthly fee, an hourly rate, or a per-port rate based on the maximum number of ports simultaneously used by subscribers at any one time during the billing cycle. Moreover, the invention can be practiced with other billing arrangements.

Each subscriber receives a preliminary script for execution on a client system, thereby enabling the client system to access the Internet via one or more POPs. As the client system accesses the Internet using the POPs included in the preliminary script, an access monitoring system associated with the intermediary compiles a usage profile for each client system. The usage profile characterizes the use of the client system to access the Internet by recording, for example, the POPs that the client system accesses, the time of day and the day of the week of access, the total number of hours of access, etc.

After a selected period of time, the intermediary evaluates the user profiles for the client systems to determine whether alternative POPs would be more cost effective for particular client systems. For instance, the access monitoring system evaluates the usage profile of a selected client system to determine whether a lower access cost could have been obtained if the client system had instead accessed the Internet via different POPs. In evaluating the usage pattern, the access monitoring system forecasts the client system's total connection time and connection time during hours of peak Internet load during the upcoming billing cycle. The evaluation conducted by the access monitoring system further involves identifying the set of available POPs for each client system, including a determination of the billing methods and connection costs for each POP. The access monitoring system also determines which POPs are local for the client system. Based on these considerations, the access monitoring system identifies one or more POPs to be used by the client system for establishing access to the Internet.

In one example, a subscriber whose usage profile indicates heavy Internet usage can be assigned a POP that charges at a flat monthly fee as opposed to an hourly rate. In contrast, subscribers having a usage profile indicating relatively light Internet usage may be assigned an hourly rate POP. The access monitoring system then generates a script to be executed at the client system to instruct the client system to use the cost effective POPs. The script is transmitted to the client system, where it is executed the next time the client system is used to access the Internet.

The scripts can have any desired level of detail in order to appropriately select cost-effective POPs for particular client systems and to efficiently distribute Internet load among different POPs. Accordingly, the access monitoring system can reduce the access failure rate of client systems compared to conventional approaches by comparing the usage profiles of multiple client systems with the available POPs in a given geographic area. For instance, based on the usage profiles, the systems of the invention can predict that certain users are likely to access the Internet at certain hours, such as peak or non-peak hours. In response, the subscribers can be assigned POPs that are likely to be available during those hours.

Each client system can be assigned more than one script, with instructions to use particular scripts under specified conditions. For instance, a client system can be instructed to use a first script during traditionally peak hours of Internet traffic and to use a second script during other hours. Alternatively, a client system can be instructed to use a first script until the cumulative number of hours of Internet access during the billing cycle reaches a selected number, at which point the client system is instructed to use a second script. Scripts typically include a primary POP and any number of alternative POPs to be used if the primary POP is unavailable.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments-thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
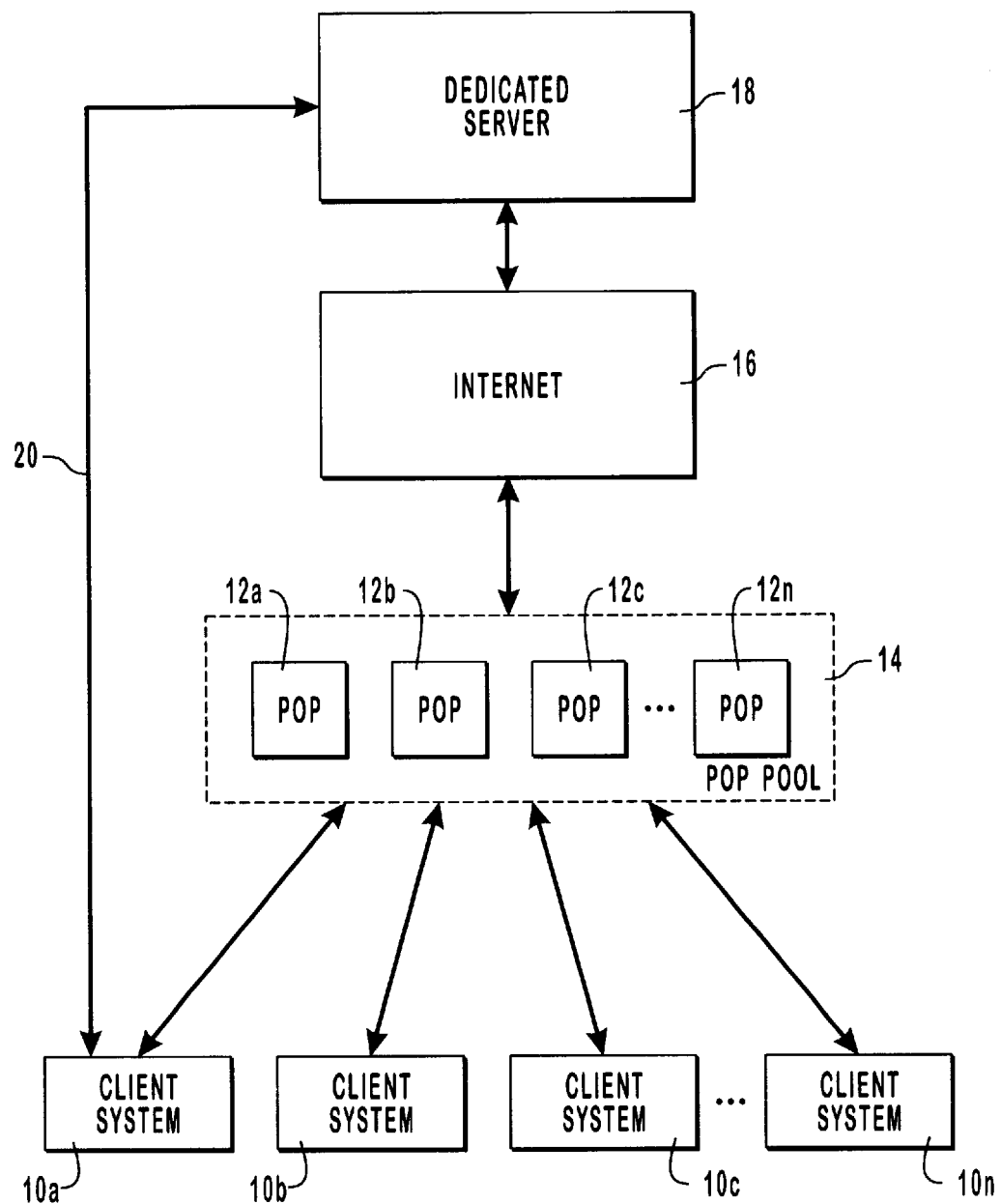
FIG. 1 is a schematic diagram illustrating an Internet access system with which the invention can be practiced, wherein the Internet access system includes client systems, points-of-presence nodes, the Internet, and a dedicated server.

The present invention relates to selecting POPs for use by client systems to access the Internet or another information retrieval system based on cost and/or load balancing considerations. According to the invention, usage profiles characterizing Internet access by client systems enables the client systems to be assigned POPs that minimize or reduce the overall access costs. In addition, the usage profiles enable the client systems to be assigned POPs to minimize or reduce the access failure rate experienced by subscribers as they attempt to access the Internet.

The invention is described below by using diagrams to illustrate either the structure or processing of embodiments used to implement the system and method of the present invention. Using the diagrams in this manner to present the invention should not be construed as limiting of its scope. The embodiments of the present invention may comprise a special purpose or general purpose computer including various computer-executable instructions or computer hardware, as discussed in greater detail below.

Embodiments within the scope of the present invention include computer-readable media having computer-executable instructions or data fields stored thereon. Such computer-readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired computer-executable instructions or data fields and which can accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. The computer-executable instructions and associated data fields represent an example of program code means for executing the steps of the invention disclosed herein. In some contexts, the computer-executable instructions will be described as program modules being executed by a computer or processor within a consumer electronics device. Generally, program modules include routines, programs, objects, components, data structures, etc. that perform particular tasks or implement particular abstract data. The computer-executable instructions and program modules represent examples of the program code means for executing the steps of the methods disclosed herein.

While the invention is described herein in the context of the Internet, it is recognized that the invention can be practiced with other wide area networks. The principles disclosed herein for selecting, assigning, and using access providers according to cost criteria can be applied to other systems, as well as those described herein. Likewise, selecting access providers and assigning them to multiple subscribers in order to reduce maximum load of selected access providers and otherwise efficiently balance load can be practiced in other environments in addition to the Internet.

In one embodiment, the systems and methods for selecting appropriate POPs for use by client systems can be employed by intermediaries, such as Internet access brokers, which enter into contractual arrangements with multiple Internet service providers in a particular geographic region to offer Internet access to subscribers via any of multiple POPs. Internet access services provided by WebTV Networks, Inc., of Mountain View, Calif., represent one example of services provided by an Internet access broker. These features of the invention are not limited to being used by such intermediaries, however. For instance, the invention can be practiced by entities that directly operate more than one POP in a particular geographic region. Those skilled in the art will recognize that the principles disclosed herein have wide applicability in numerous other Internet and wide area network environments and business models. Accordingly, references to "intermediaries" and "Internet access brokers" are to be understood as extending to other entities capable of practicing the invention.

Exemplary Computing and Network Environment

FIG. 1 illustrates an example of a distributed computing environment in which the invention can be practiced. The distributed computing environment of FIG. 1 includes a plurality of client systems $10a–10n$, each adapted for accessing the Internet or otherwise accessing network resources of an information retrieval system. As used herein, the term "network resources" includes any services or information accessible to users of the Internet, and can also be understood as representing the Internet, itself, or other wide area networks. The term "information retrieval system" includes the Internet and any other system whereby users can access information or computer-implemented services using a networked, special purpose or general purpose computer.

Client systems $10a–10n$ can be a conventional personal computer or other computing device having hardware and software for enabling it to access the Internet. In one embodiment, client systems $10a–10n$ are Web TV boxes available from WebTV Networks, Inc. Selected features and components of client system 10 are discussed in greater detail below in reference to FIG. 3.

Client system 10 access the Internet according to FIG. 1 via any one of a plurality of points-of-presence (POPs) $12a–12n$. In this example, each of POPs $12a–12n$ can be operated by a different Internet service provider or by the same Internet service provider. For example, POPs $12a–12n$ can be conventional point of presence nodes each having a modem pool that can simultaneously service multiple client systems 10 that have connected thereto through conventional telephone lines. Alternatively, POPs 12 can provide the client systems 10 with ISDN services, cable modem functionality, or other desired communication services by which the Internet can be accessed. The term "access provider" as used herein, extends to POPs and any other device or system that can be selected to provide Internet access or access to other information retrieval systems or wide area networks. Together, POPs $12a–12n$ constitute a POP pool 14 assembled by the Internet access broker. As will be further discussed herein, client systems 10 are instructed to select an appropriate one of POPs 12 to access Internet 16 based on cost, load balancing, or other factors.

The distributed computing environment of FIG. 1 can include Internet 16 or network resources associated with any other wide area network or information retrieval system. In the example of FIG. 1, a dedicated server 18 provides network resources only to client systems 10 that have subscribed to the services of the dedicated server. The network resources of dedicated server 18 can be accessed by means of the Internet 16 or by a direct-dial line 20 between client systems 10 and dedicated server 18, thereby bypassing the Internet 16. Dedicated server 18 includes certain elements and features of certain embodiments of the invention, as further described below in reference to FIG. 2. For instance, in one embodiment, dedicated server 18 represents an access monitoring system that monitors usage of client systems 10 as they access Internet 16. Dedicated server 18 can further identify specific POPs 12 that are to be assigned to particular client systems 10 based on cost, load balancing, and other factors. In one embodiment, dedicated server 18 is operated by the Internet access broker that has assembled POP pool 14.

For purposes of illustrating an example of the methods by which dedicated server 18 selects one or more POPs for use by client systems $10a–10n$, POPs $12a$, $12b$, and $12c$ are assumed to provide Internet access services according to the following billing arrangements. POP $12a$ provides Internet access on a fixed monthly fee. In particular, the Internet service provider operating POP $12a$ charges the Internet access broker a fixed monthly fee for each client system 10 that uses POP $12a$ during a billing cycle of one month.

POP $12b$ offers Internet access services to client systems 10 on hourly rate. In other words, the Internet service provider that operates POP $12b$ charges the Internet access broker an amount proportional to the total number of hours that individual client systems 10 use POP 12b. POP 12c offers Internet access to client systems 10 based on the maximum number of client systems 10 that simultaneously access the Internet via POP 12c during a monthly billing cycle. In a simple per-port example, if the maximum number of client systems 10 that simultaneously access POP 12c at any time during a month is ten, the Internet access broker is charged an access fee proportional to the ten client systems. Often, per-port billing arrangements are based on the average of the top N (e.g., N=3) daily peaks during the month. The foregoing billing arrangements employed by POPs 12a, 12b, and 12c are referred to herein as fixed fee, hourly rate, and per-port access, respectively. Some POPs 12 are offered to Internet access brokers according to one billing arrangement on one day and another billing arrangement on another.

It should be understood that the time periods used above to describe the billing practices (i.e. hourly and monthly) are not limited to these specific intervals, but can be instead any other interval. Likewise, those skilled in the art will recognize that the invention is compatible with other billing arrangements in addition to those specifically described above, including those currently in use and those that might be developed and used in the future.

POP Selection and Script Creation

Client systems 10a–10n store one or more scripts that, when executed, enable the client system to access the appropriate POP 12. Those skilled in the art will understand how scripts are used to establish communication between client systems and POPs. In practice, client system 10 receives a preliminary script to be used when accessing the Internet 16 for the first time or to repeatedly access the Internet for a selected period of time after the first use. For example, the preliminary script can be obtained for a new client system 10 by establishing communication with dedicated server 18 via the direct link 20. Dedicated server 18 can determine the geographic location of client system 10 using automatic number identification (ANI) or by directly questioning a user of client system 10. A preliminary script is then used by client system 10 until dedicated server 18 has monitored the usage pattern of client system 10 during a period of time sufficient to permit the creation of a new script specifically tailored for the client system.

Figure 2:
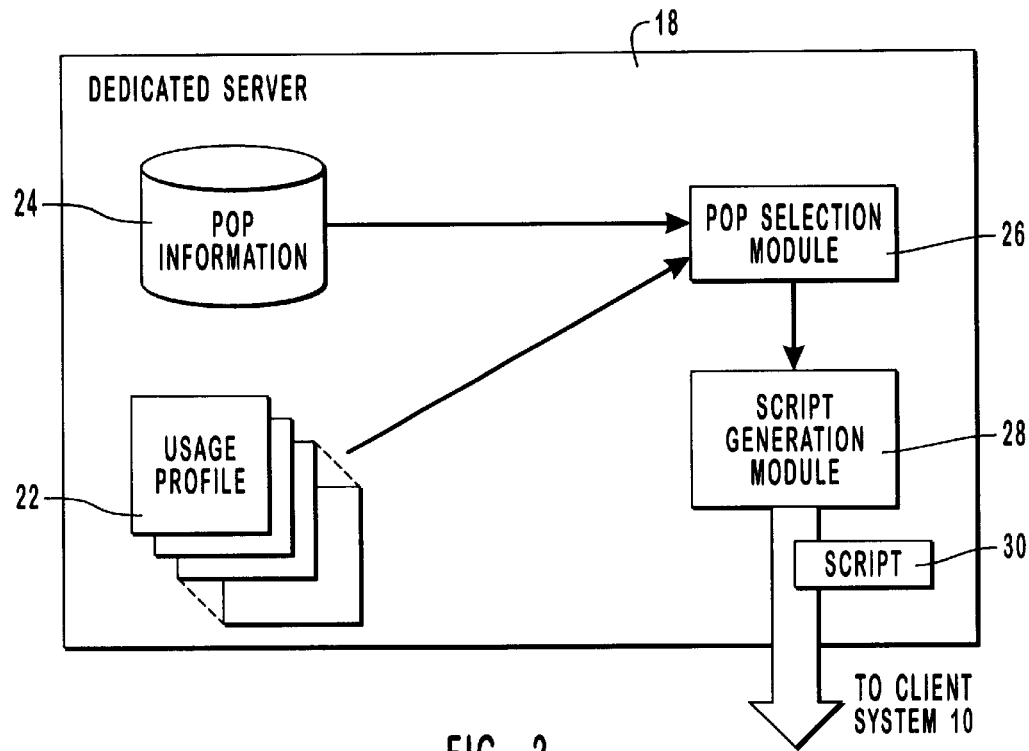
FIG. 2 is a schematic diagram illustrating the dedicated server of FIG. 1, including components for monitoring client access of the Internet and generating scripts instructing the client systems to use appropriate points-of-presence nodes.

FIG. 2 illustrates selected components and functional modules of dedicated server 18 that are used to monitor the usage of the client systems and to generate scripts appropriate for the client systems. As a subscriber uses client system 10 to access Internet 16, dedicated server 18 compiles a usage profile 22 characterizing the use of client system 10. Usage profile 22 can include any desired and observable characteristics of the usage pattern of client system 10. For instance, usage profile 22 can record the total number of hours of access by client system 10 and the time of day and day of week of access. In one embodiment, usage profiles 22 are compiled by assigning scores to or otherwise tabulating the usage patterns of client systems once a week.

Periodically, POP selection module 26 and script generation module 28 are used to determine whether a new script for client system 10 is warranted and, if so, to revise the script. POP selection module 26 identifies appropriate POPs for use by client systems 12 based on an evaluation of usage profiles 22 and POP information 24, as will be more fully described below. It has been found that evaluating the need for new script for client systems 10 every four weeks or once a month can be convenient, since Internet service providers typically have monthly billing cycles. Nonetheless, any desired period can be used for evaluating the POPs assigned to client systems 10.

POP information 24 represents any desired characteristics of POPs 12, including the billing arrangement used by each POP 12, the maximum load that can be supported by the POPs, the geographic location of each POP, etc.

When dedicated server 18 selects POPs to be used by a client system 10, script generation module 28 composes a script 30 that includes computer executable instructions for instructing client system 10 to attempt to connect to the POPs selected by POPs selection module 26. Script 30 is then transmitted to client system 10, as shown in FIG. 2. The factors used to identify appropriate POPs to be used by client systems 10 include cost and reliability. These two factors and other factors optionally can be used together or individually.

A. POPs Selected for Cost-Effectiveness

POP selection module 26 can identify, from POP pool 14, the POPs that are determined to be cost effective based on the usage profile 22 for a particular client system 10. According to one embodiment, POP selection module 26 reviews usage profile 22 and identifies an access cost incurred by the associated client system 10. The identification of the access cost can involve directly receiving from the POP a report of the costs incurred by the subscriber or estimating the access cost based on a measured access time and knowledge of the billing practices of the POP.

Based on the incurred access cost, the usage patterns described in the usage profile 22, and billing data included in POP information 24, POP selection module 26 determines whether any of the other POPs 12 could be used by the particular client system 10 to gain Internet access at a lower access cost. For instance, POP selection module 26 can calculate the access cost that would have been incurred by the client system 10 if the client system had used alternative POPs. Alternatively, POP selection module 26 can compare the usage profile of the client system 10 against POP selection rules designating certain POPs as being appropriate for the client systems 10.

When POP selection module 26 evaluates the expected cost of assigning a per-port POP to a client system, the analysis typically includes identifying a group of client systems to which the per-port POP can be assigned. This evaluation involves determining the hours that the individual client systems in the group are likely to access the per-port POP. If the individual client systems are likely to access the per-port POP during the same hours, the per-port POP tends to be an undesirable choice, since the maximum number of ports simultaneously used by the client systems of the group may be high. In contrast, a per-port POP may be appropriate if the usage profiles 22 indicate that the individual client systems will access the per-port POP at different hours.

Those skilled in the art will recognize, upon learning of the invention disclosed herein, that there are other suitable rules, algorithms and techniques for determining whether alternative POPs 12 would provide cost-effective Internet access for client systems 10.

The following POP selection rules represent but one example of the rules that can be advantageously used with the invention to select appropriate POPs 12 for client systems 10.

1. Assign client systems that access POPs primarily during non-peak hours to per-port POPs.
2. Assign client systems that access POPs during a large number of hours to flat fee POPs.
3. Assign client systems that access POPs during a small number of hours to hourly rate POPs.

POP selection module 26 preferably assigns more than one POP 12 to client system 10. For example, each client system 10 can be assigned a primary POP and one or more backup POPs, which are to be used if the primary POP is unavailable. The primary POP and the backup POPs can have the same billing arrangement or different billing arrangements, depending on the selection rules used with POP selection module 26.

POP selection module 26 can also identify POPs to be used by client system 10 at different hours of the day, days of the week, or under other specified conditions. In such cases, POP selection module 26 and script generation module 28 produce two or more scripts 30, which are transmitted to client system 10. For example, a first script can specify use of a per-port POP during non-peak hours, while a second script can specify use of an hourly rate POP during peak hours.

B. POPs Selected for Reliability

In addition to or instead of selecting POPs on cost criteria dedicated server 18 can select new POPs for a particular client system 10 in order to efficiently distribute the load between POPs 12a–12n of FIG. 1. For example, in one embodiment, POP selection module 26 compares the usage profiles 22 of different client systems 10 to minimize or reduce the likelihood that any POPs will be overloaded during traditionally peak hours or other hours of heavy use. Balancing the load between POPs 12 has several advantages, including minimizing or reducing access failure experienced by client systems and minimizing or reducing access costs associated with POPs having per-port billing arrangements. Load balancing can be achieved, for example, by observing how many client systems 10 can access a POP before the client systems begin to be unable to establish communication with the POP. Alternatively, POP information 24 can include POP capacity information provided by POPs 12, which is then compared with the number and usage patterns of the client systems 10 that are assigned to individual POPs.

Script Use and POP Access

Figure 3:
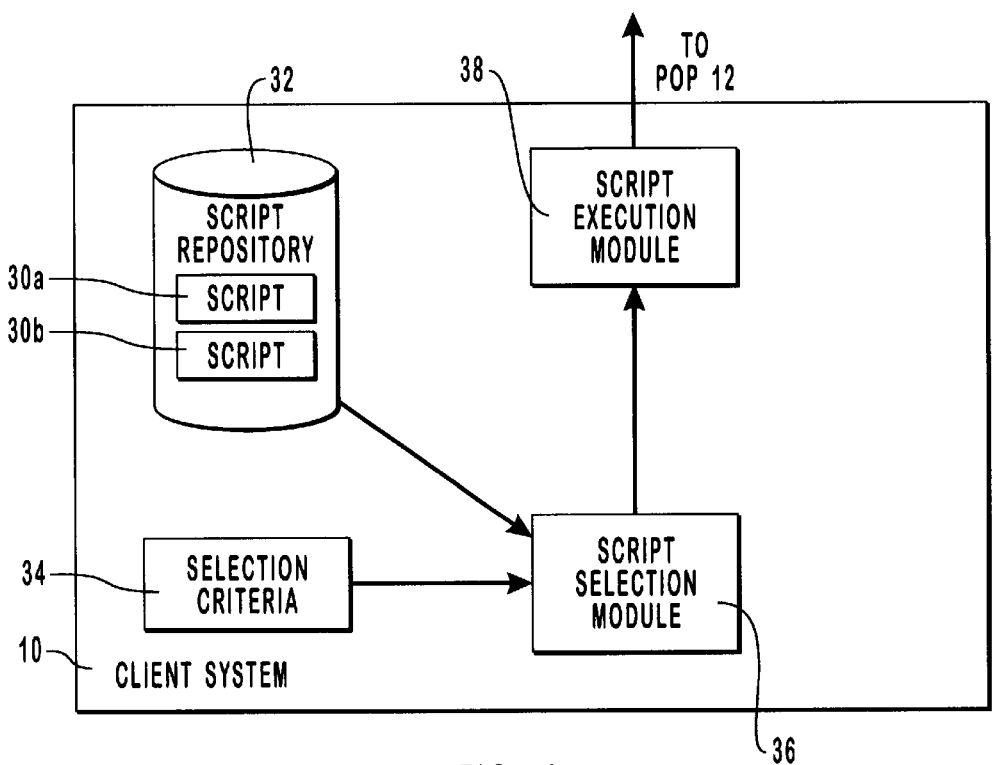
FIG. 3 is a schematic diagram depicting the client system of FIG. 1, including components for executing the scripts of the invention, whereby the client system can access the Internet via an appropriate point-of-presence node.

FIG. 3 illustrates selected elements and functional modules of client system 10. Client system includes a script repository 32, which stores one or more scripts as the scripts are received from dedicated server 18 of FIG. 2. Script repository 32 of FIG. 3 is shown storing two scripts, namely scripts 30a and 30b. Script selection criteria 34 stored at client system 10 are used to select one of the scripts 30 stored at script repository 32 when a user of client system 10 provides input to initiate access to the Internet. In some circumstances, script repository 32 will contain only one script 30; in other cases, script repository 32 will include multiple scripts.

When script repository 32 includes only a single script, script selection criteria 34 are trivial—the single script stored in the script repository is used to establish communication with the specified POP and to access network resources. However, when multiple scripts are present, the process of selecting the appropriate script is more complicated. In one embodiment, the client system has a default first script, a second script and, optionally, other scripts. The client system applies script selection criteria 34 to the scripts by determining whether any of the scripts are designated for use during the current time of day and day of week. The client system determines the current time of day and day of week and examines the scripts in script repository 32 to determine if there is a script that corresponds to the current time/day. If so, the corresponding script is used. If not, the default first script is executed by the client system.

In just one example of the use of multiple scripts, script selection criteria 34 may indicate that first script 30a is a default script to be used at all times except during the traditional peak hours of usage of the Internet, when second script 30b is to be used. Accordingly, first script 30a may instruct client system 10 to connect to a per-port POP (POP 12c of FIG. 1), while second script 30b can instruct client system 10 to connect to an hourly rate POP (POP 12b of FIG. 1). Cost savings can thereby be achieved, since client system 10 will not overload per-port POP 12b during hours of peak load.

Referring to FIG. 3, after script selection module 36 selects the appropriate script according to the script selection criteria 34, script execution module 38 executes the selected script. Client system 10 then attempts to connect to the primary POP designated by the executed script. If the attempt to connect to the primary script is successful, client system 10 accesses network resources from the Internet via the primary POP. If, however, the attempt to connect to the primary POP is unsuccessful, the script executed at script execution module 38 instructs client system 10 to attempt to again connect to the primary POP or to attempt to connect to a backup POP. In this manner, client system 10 has an alternative if the first attempt to connect to a POP is unsuccessful.

Although the invention can be practiced with only a primary POP, in many circumstances it is preferable to include one or more backup POPs. An increasing number of backup POPs can provide increasingly reliable Internet access to subscribers. However, backup POPs can increase the access costs incurred by subscribers, particularly if the backup POPs are flat fee POPs. In particular, if a subscriber connects to a backup flat fee POP and to a primary POP during a billing cycle, the subscriber incurs the flat fee access cost in addition to the access costs associated with the primary POP.

Exemplary Method for Using POPs and Scripts

Figure 4:
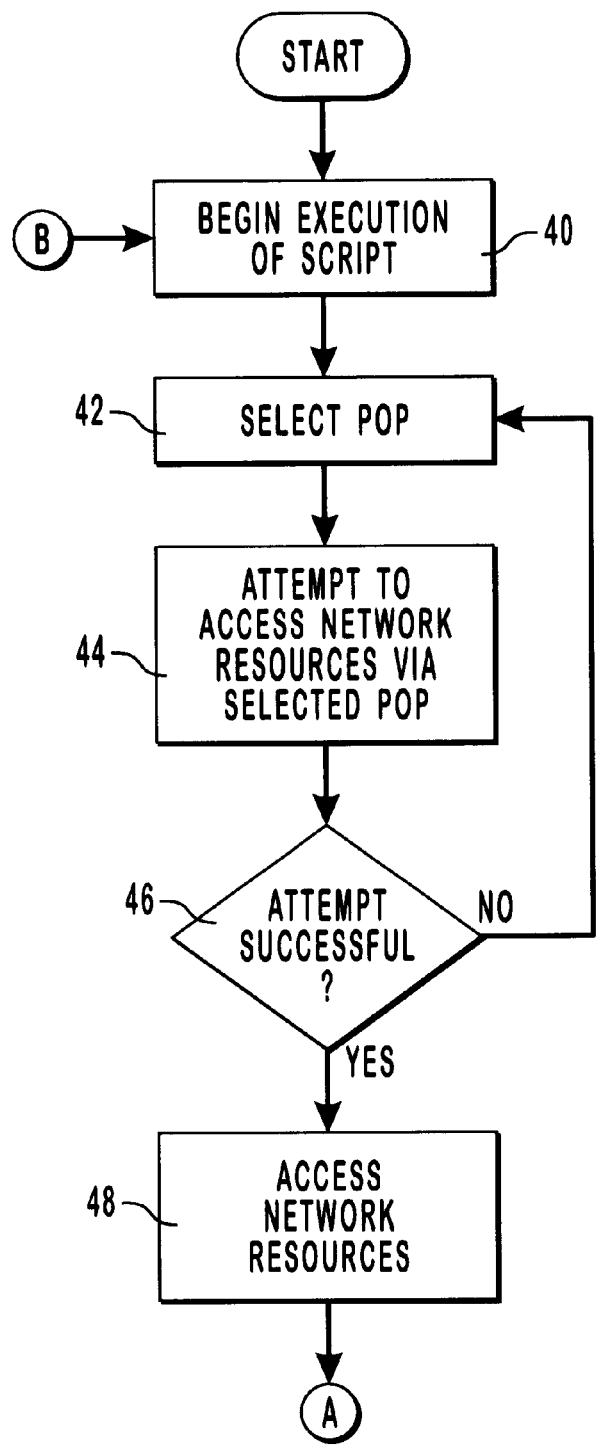
FIG. 4 is a flow diagram illustrating one embodiment of the methods of accessing the Internet via an appropriate point-of-presence node.
Figure 5:
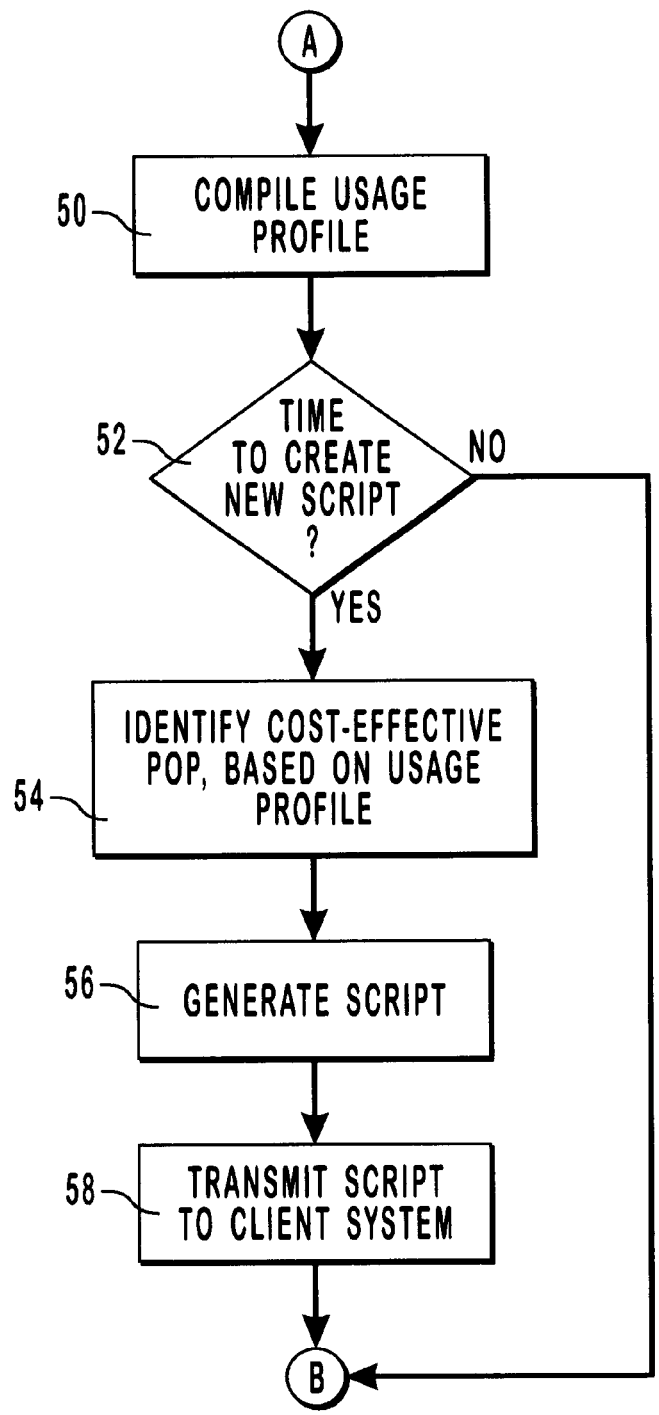
FIG. 5 is a flow diagram showing one embodiment of the methods of monitoring client access of the Internet and generating scripts instructing the client system to use appropriate points-of-presence nodes.

FIGS. 4 and 5 are flow charts representing an embodiment of the methods for selecting appropriate POPs for use by client systems using cost criteria, generating scripts instructing client systems to use the appropriate POPs, and executing the scripts. The steps of FIG. 4 are generally conducted at client systems 10, whereas the steps of FIG. 5 are generally conducted at dedicated server 18 or another access monitoring system.

In step 40, the client system begins execution of a script that has been stored at the client system when a user of the client system provides specified input to initiate Internet access. As noted herein, the client system 10 can use the preliminary script during the period of time prior to the dedicated server generating a tailored script. In step 42, the client system selects the POP designated by the script. In step 44, the client system attempts to access network resources via the selected POP by dialing into the POP. If, according to the decision block 46, the attempt is successful, the client accesses network resources as shown in 48. If the a attempt is unsuccessful, the method returns to step 42 and selects the same or different POP. The subroutine of steps 42, 44, and 46 is conducted until the client system successfully connects to a selected POP.

Turning now to FIG. 5, the dedicated server compiles a usage profile characterizing the use of the client system as shown in step 50. According to decision block 52, if a predetermined period of time has elapsed since the last time the dedicated server evaluated the need for a new script to be assigned to the client system, the method advances from decision block 52 to step 54. In step 54, the access monitoring system identifies one or more cost-effective POPs based on the usage profile. In step 56, the access monitoring system generates a script, which is transmitted to the client system in step 58. The new script is used the next time that the client system attempts to access the Internet. If, according to decision block 52, the time to create a new script has not yet arrived, the method advances to step 40 of FIG. 4.

EXAMPLE

In order to illustrate the operation of the invention and the advantages of selecting and assigning POPs to client systems as disclosed herein, the following example is presented. Although this example uses hypothetical usage patterns, the principles illustrated by the example are representative of actual usage by subscribers of services provided by Internet access brokers.

In the following example, POPs 12a, 12b, and 12c, are designated as a flat fee POP, an hourly rate POP, and a per-port POP, respectively, as these terms have been defined herein. It is also assumed that client systems 10 of FIG. 1 have been given a preliminary script and have begun to access Internet 16 via the POPs designated in the preliminary scripts. It is further assumed that POPs 12a–12c of POP pool 14 ordinarily experience peak load during the hours of 5 p.m. to 9 p.m. local time. In this example, POP 12a charges a flat fee of $10 per month for each client system 10 that connects thereto during the month. POP 12b charges $0.70 for each hour that a client system connects thereto. Finally, POP 12c charges $20 multiplied by the maximum number of client systems 10 that simultaneously connect to POP 12c at any time during the month.

The preliminary scripts for client system 10a, 10b, and 10c instruct the corresponding client system to connect to POP 12b as a primary POP at the hourly rate and to one or more other hourly rate backup POPs. During the first month of operation, dedicated server 18 of FIG. 2 compiles usage profiles characterizing the use of client systems 10a–10c. Table A presents the usage patterns for the first month described in the usage profiles.

TABLE A

First Month Actual Access Costs

|  | Total Access Hours | Peak Access Hours | Access Cost |
| --- | --- | --- | --- |
| Client System 10a | 35 | 16 | $24.50 |
| Client System 10b | 6 | 2 | $4.20 |
| Client System 10c | 40 | 6 | $28.00 |
| Total |  |  | $56.70 |

After the end of the first month, POPs selection module 26 analyzes usage profiles 22 and POP information 24 to determine whether any of the client systems 10a–10c would have incurred lower access costs using POPs having different billing arrangements. For instance, POP selection module 26 determines that if client system 10a had been assigned flat fee POP 12a (at $10/month) and a flat fee backup POP (at $10/month), it would have likely incurred access costs of $20. It is possible that a lower access cost in the range of $10 to $20 could have been obtained by client system 10a by using flat fee POP 12a and hourly rate backup POP 12b only if POP 12a is unavailable. In this case, POP selection module 26 selects flat fee POP 12a and a flat fee backup POP.

With respect to client system 10b, POP selection module 26 determines that hourly rate POP 12b is appropriate in view of the relatively small number of hours of access. POP selection module 26 determines that client system 10c, having a large number of total hours of access, but few peak hours, is a candidate for per-port POP 12c. For purposes of this example, it is assumed that if a large number of client systems having usage patterns similar to those exhibited by client system 10c are assigned to a per-port POP, the maximum number of client systems that simultaneously access the per-port POP during the month will be approximately 40% of the total number of assigned client systems. Of course, this percentage is highly dependent on the usage patterns of the client systems assigned to any particular per-port POP and on other factors. In this case, however, POP selection module 26 assumes that client system 10c would have been allocated access costs of $8.00 (i.e., $20×40%) if POP 12c had been used. Table B presents the results of the foregoing evaluation, which in effect represents the predicted access costs for the second month.

TABLE B

Second Month Predicted Access Costs

|  | Predicted Total Access Hours | Predicted Peak Access Hours | Predicted Access Cost |
| --- | --- | --- | --- |
| Client System 10a | 35 | 16 | $20.00 |
| Client System 10b | 6 | 2 | $4.20 |
| Client System 10c | 40 | 6 | $8.00 |
| Total |  |  | $32.20 |

Based on the evaluation summarized above in Table B, script generation module 28 creates scripts that assign flat fee POP 12a and a backup flat fee POP to client system 10a, hourly rate POP 12b and a backup hourly rate POP to client system lob, and per-port POP 12c and a backup per-port POP to client system 10c. As shown in Tables A and B, it is estimated that the access costs could have been reduced by more than 43% using the POPs now assigned to the client systems in comparison to the POPs actually used.

During the course of the second month, usage profiles 22 are updated with the second month's usage patterns. The first month data can be entirely replaced with second month data or, alternatively, a running, weighted average of the second month's usage and previous months' usage can be compiled. As is typically the case, the actual usage of client systems 10a–10c departs from the predicted usage. In addition, actual amounts allocated to client systems using per-port POPs may vary from predicted values. In this case, the actual amount allocated during the second month to the client systems using per-port POP 12c has been $10 instead of the predicted $8. Table C includes the second month actual usage and access costs.

TABLE C

Second Month Actual Access Costs

|  | Total Access Hours | Peak Access Hours | Access Cost |
| --- | --- | --- | --- |
| Client System 10a | 26 | 12 | $20.00 |
| Client System 10b | 15 | 3 | $10.50 |
| Client System 10c | 32 | 8 | $10.00 |

TABLE C-continued

Second Month Actual Access Costs

| | Total Access Hours | Peak Access Hours | Access Cost |
|---|---|---|---|
| Total | | | $40.50 |

Table D represents the access costs that would have been incurred if the hourly rate POPs designated by the preliminary scripts of the first month had used during the second month.

TABLE D

Second Month Access Costs Using Previous Scripts

| | Total Access Hours | Peak Access Hours | Access Cost |
|---|---|---|---|
| Client System 10a | 26 | 12 | $18.20 |
| Client System 10b | 15 | 3 | $10.50 |
| Client System 10c | 32 | 8 | $22.40 |
| Total | | | $51.10 |

Table C and D show that the new POP assignments specified in the scripts generated at the end of the first month have saved more than 20% of the access costs that would have been otherwise charged to the Internet access broker. While Internet access may vary from month to month sufficiently that new POP assignment may not result in savings for every client system every month (e.g., client 10a), in general, significant savings can be gained using the systems and methods of the invention.

At the end of the second month, the process of identifying cost-effective POPs based on usage profiles 22 and POP information 24 can be repeated. For instance, hourly rate POP 12b may be appropriate for use by client system 10a in the third month.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In an access monitoring system included in an information retrieval system, wherein the information retrieval system further includes a client system, a method for selecting an access provider by which the client system is to gain access to network resources, comprising the acts of:
   compiling a usage profile associated with the client system that characterizes the use of the client system to access network resources;
   identifying an access cost that has been incurred by the client system in accessing the network resources;
   based on the usage profile and the access cost, selecting, from a plurality of available access providers, an access provider from which the client system is to subsequently access the network resources; and
   providing information to the client system that enables the client system to use the selected access provider to access the network resources.

2. A method as defined in claim 1, wherein the act of compiling a usage profile a comprises the act of monitoring the use of the client system.

3. A method as defined in claim 1, wherein:
   the information comprises a script that includes computer-executable instructions for instructing the client system to access the network resources from the selected access provider; and
   the act of providing information to the client system comprises the act of transmitting the script to the client system.

4. A method as defined in claim 1, wherein the access monitoring system is located remotely with respect to the client system.

5. A method as defined in claim 1, wherein the act of compiling a usage profile comprises the act of compiling a record of at least one of the total number of hours of access by the client system during a selected time interval and the time of day of access by the client system.

6. A method as defined in claim 1, wherein the act of selecting the access provider comprises the acts of:
   determining that the client system would have incurred a lower access cost if the client system had used an access provider different from an access provider actually used by the client system when the access cost was incurred; and
   selecting the different access provider to be the selected access provider.

7. A method as defined in claim 6, wherein the act of identifying the access cost comprises the act of estimating the access cost based on the usage profile.

8. A method as defined in claim 1, wherein:
   the usage profile indicates that the client system ha s accessed the network resources primarily during non-peak hours; and
   the selected access provider is one that provides access to network resources on a per-port cost basis.

9. A method as defined in claim 1, wherein:
   the usage profile indicates that the client system has accessed the network resources for more than a specified number of hours during a selected time interval; and
   the selected access provider is one that provides access to network resources on a flat fee cost basis.

10. A method as defined in claim 1, wherein:
    the usage profile indicates that the client system has accessed the network resources for less than a specified number of hours during a selected time interval; and
    the selected access provider is one that provides access to network resources on an hourly cost basis.

11. A method as defined in claim 1, wherein the act selecting an access provider from which the client system is to subsequently access the network resources is further performed so as to balance load between the plurality of access providers.

12. In an access monitoring system included in an information retrieval system, wherein the information retrieval system further includes a client system, a method for selecting an access provider by which the client system is to gain access to network resources, comprising the acts of:
    compiling a usage profile associated with the client system that characterizes the use of the client system to gain access to network resources;
    identifying an access cost that has been incurred by the client system gaining access to the network resources;
    based on the usage profile and the access cost, selecting, from a plurality of available access providers, an access provider from which the client system is to subsequently gain access to the network resources, wherein it is expected that the client system can access the network resources using the access provider while incurring a lower access cost; and providing information to the client system that enables the client system to use the selected access provider to gain access to the network resources.

13. A method as defined in claim 12, wherein the access cost comprises a monetary access cost incurred in accessing the network resources.

14. A method as defined in claim 12, wherein the access cost comprises the reliability of accessing the network resources.

15. A method as defined in claim 12, wherein the access cost is associated with a load that exists among a plurality of access providers.

16. A method as defined in claim 12, wherein the act of selecting the access provider comprises the acts of:

determining that the client system would have incurred the lower access cost if the client system had used an access provider different from an access provider actually used by the client system when the access cost was incurred; and selecting the different access provider to be the selected access provider.

17. In a client system included in an information retrieval system, the client system being configured to access network resources via the information retrieval system, a method for selecting an access provider by which the client system is to access the network resources, comprising the acts of:

storing first information and second information at the client system, wherein the first information, when processed by the client system, enables the client system to access the network resources via a first access provider, and wherein the second information, when processed by the client system, enables the client system to access the network resources via a second access provider;

based at least on access cost criteria, selecting one of the first information and the second information; and accessing the network resources using the selected one of the first information and the second information.

18. A method as defined in claim 17, wherein the access cost criteria are associated with a monetary access cost incurred in accessing the network resources.

19. A method as defined in claim 17, wherein the access cost criteria are associated with the reliability of accessing the network resources.

20. A method as defined in claim 17, wherein the access cost criteria are associated with load balancing between a plurality of access providers.

21. A method as defined in claim 17, wherein the act of selecting one of the first information and the second information comprises the acts of:

at a first time, conducting the acts of:
  selecting the first information; and
  accessing the network resources via the first access provider; and at a second time, when a load on the information retrieval system is greater than the load on the information retrieval at the first time, conducting the acts of:
  selecting the second information; and
  accessing the network resources via the second access provider.

22. A method as defined in claim 21, wherein:
the first access provider charges a first access cost based on a maximum number of associated client systems that simultaneously access the network resources during a billing cycle; and the second access provider charges a second access cost based on a period of time during which the network resources are accessed via the first access provider.

23. A method as defined in claim 17, wherein the first information, when processed by the client system, provide instructions to access the network resources via one or two or more access providers, the two or more access providers including the first access provider.

24. A method as defined in claim 23, wherein:

the act of selecting one of the first information and the second information comprises the act of selecting the first information; and the method further comprises the acts of:
  attempting and failing to access the network resources via the first access provider; and
  accessing the network resources via the second access provider.

25. A method as defined in claim 17, wherein the first information and the second information comprise a first script and a second script, respectively.

26. A method as defined in claim 17, further comprising the act of receiving the second information from an access monitoring system included in the information retrieval system, such that the access monitoring system enables the client system to access the network resources from the second access provider.

27. In an information retrieval system comprising an access monitoring system and a plurality of client systems including a first client system and a second client system capable of accessing network resources of the information retrieval system via a plurality of access providers, a method for instructing the plurality of client systems to access the network resources via selected access providers, comprising the acts of:

compiling, by the access monitoring system, a usage profile and an access cost associated with each of the plurality of client systems that include the first client system and the second client system, each usage profile characterizing the use of the associated client system to access the network resources, and each access cost characterizing the cost incurred by the associated client system to access the network resources; and based on the usage profiles and the access costs, generating first information and second information, wherein:
  the first information, when processed by the first client system, enables the first client system to access the network resources via at least a first access provider; and
  the second information, when processed by the second client system, enables the second client system to access the network resources via at least a second access provider.

28. A method as defined in claim 27, wherein the first information comprises a script that, when processed by the first client system, enables the first client system to access the network resources via the first access provider.

29. A method as defined in claim 27, wherein the act of generating the first information and the second information comprise the act of selecting the first access provider and the second access provider, wherein the usage profiles indicate that if the first client system had used the first access provider to access the network resources and if the second client system had used the second access provider to access network resources, an improved load balance among the plurality of access providers would have been achieved compared to an actual load balance.

30. A method as defined in claim 27, wherein the usage profiles indicate that the first client system has accessed the network resources more than the second client system has accessed the network resources, and wherein the act of generating the first information and the second information comprise the acts of:

selecting the first access provider, wherein the first access provider charges a first access cost having a fixed amount that is not dependent on the amount of time during which the network resources are accessed via the first access provider during a billing cycle; and selecting the second access provider, wherein the second access provider charges a second access cost having an amount that is dependent on the amount of time during which the network resources are accessed via the first access provider during a billing cycle.

31. A method as defined in claim 27, wherein:

the method further comprises the act of designating a peak load time during which the information retrieval system experiences a heavy load compared to a load experienced at other times, the usage profile indicating that the first client system has accessed the network resources during the peak load time more than the second client has accessed the network resources during the peak load time; and the act of generating the first information and the second information comprise the acts of:

selecting the first access provider, wherein the first access provider charges a first access cost having a fixed amount that is not dependent on the amount of time during which the network resources are accessed via the first access provider during a billing cycle; and selecting the second access provider, wherein the second access provider charges a second access cost having an amount that is based on a maximum number of associated client systems that simultaneously access network resources via the second access provider during a billing cycle.

32. A method as defined in claim 27, wherein:

the method further comprises the act of designating a peak load time during which the information retrieval system experiences a heavy load compared to a load experienced at other times, the usage profile indicating that the first client system has accessed the network resources during the peak load time more than the second client has accessed the network resources during the peak load time; and the act of generating the first information and the second information comprise the acts of:

selecting the first access provider, wherein the first access provider charges a first access cost having an amount that is dependent on the amount of time during which the network resources are accessed via the first access provider during a billing cycle; and selecting the second access provider, wherein the second access provider charges a second access cost having an amount that is based on a maximum number of associated client systems that simultaneously access network resources via the second access provider during a billing cycle.

* * * * *